United States Patent
Kellum et al.

(10) Patent No.: US 7,266,438 B2
(45) Date of Patent: Sep. 4, 2007

(54) METHOD OF ASSISTING DRIVER TO NEGOTIATE A ROADWAY

(75) Inventors: Carroll C. Kellum, Rochester Hills, MI (US); Donald K. Grimm, Utica, MI (US); Varsha Sadekar, Sterling Heights, MI (US); Sarmad Y. Hermiz, Troy, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 26 days.

(21) Appl. No.: 11/212,896

(22) Filed: Aug. 26, 2005

(65) Prior Publication Data

US 2007/0050127 A1 Mar. 1, 2007

(51) Int. Cl.
G01C 21/00 (2006.01)

(52) U.S. Cl. .................. 701/93; 701/201; 701/209; 701/210; 701/208; 340/436; 340/990

(58) Field of Classification Search ............... 701/210, 701/26, 201, 209, 208, 211, 221, 224, 70, 701/72, 93, 1, 213; 340/438, 441, 460, 990, 340/995, 988
See application file for complete search history.

(56) References Cited

U.S. PATENT DOCUMENTS

| | | | |
|---|---|---|---|
| 5,233,526 A * | 8/1993 | Detriche et al. .............. | 701/26 |
| 5,315,295 A | 5/1994 | Fujii | |
| 5,809,448 A * | 9/1998 | Gimenez et al. ............ | 701/213 |
| 5,922,036 A * | 7/1999 | Yasui et al. .................... | 701/28 |
| 6,092,014 A * | 7/2000 | Okada ......................... | 701/70 |
| 6,138,084 A | 10/2000 | Mine | |
| 6,208,927 B1 | 3/2001 | Mine et al. | |
| 6,263,268 B1 * | 7/2001 | Nathanson ................... | 701/29 |
| 6,298,296 B1 * | 10/2001 | Takahashi .................... | 701/70 |
| 6,343,253 B1 * | 1/2002 | Matsuura et al. ........... | 701/200 |
| 6,401,023 B1 | 6/2002 | Takahashi | |
| 6,424,904 B1 | 7/2002 | Takahashi et al. | |
| 6,498,972 B1 * | 12/2002 | Rao et al. ...................... | 701/45 |
| 6,604,025 B2 * | 8/2003 | Ries-Mueller ................. | 701/1 |
| 6,607,255 B2 * | 8/2003 | Bond et al. ................. | 303/193 |
| 6,615,137 B2 * | 9/2003 | Lutter et al. ................ | 701/301 |

(Continued)

OTHER PUBLICATIONS

Sekine, H, A Study of Self-Reliant Cornering Speed Control System, Vehicle Navigation and Information Systems Conference, Aug. 31, 1994, pp. 441-444.

(Continued)

Primary Examiner—Thomas Black
Assistant Examiner—Jorge O Peche

(57) ABSTRACT

A method of assisting a driver to negotiate a roadway by identifying a curve from a map database (12); calculating an estimated negotiable speed for the curve (14); advising the driver of the upcoming curve (16); warning the driver if he attempts to negotiate the curve at a speed that is greater than the estimated negotiable speed (18); and controlling the vehicle (10) in order to attempt to safely negotiate the curve (20). When the curve is identified in advance rather in real-time, identification of the curve, and possibly one or more characteristics of the curve as well as the estimated negotiable speed, may be stored for subsequent access and use (22). Furthermore, the advisory, warning, and control behaviors may be varied based on pre-established or determined conditions (24). Additionally, the actual vehicle state as it pertains to entering and exiting the curve may be determined (26).

23 Claims, 3 Drawing Sheets

U.S. PATENT DOCUMENTS

| | | |
|---|---|---|
| 6,674,434 B1 * | 1/2004 | Chojnacki et al. ........... 345/428 |
| 6,675,090 B2 * | 1/2004 | Matsuura .................... 701/200 |
| 6,718,259 B1 * | 4/2004 | Khosla ....................... 701/200 |
| 6,725,145 B1 | 4/2004 | Takahashi et al. |
| 6,748,302 B2 * | 6/2004 | Kawazoe ....................... 701/1 |
| 6,768,944 B2 | 7/2004 | Breed et al. |
| 6,868,324 B2 | 3/2005 | Matsumoto et al. |
| 6,968,266 B2 * | 11/2005 | Ahmed-Zaid et al. ........ 701/96 |
| 7,124,027 B1 * | 10/2006 | Ernst et al. ................. 701/301 |
| 2003/0139867 A1 * | 7/2003 | Browne et al. ............... 701/45 |
| 2003/0204299 A1 | 10/2003 | Waldis et al. |
| 2004/0111209 A1 | 6/2004 | Kagawa et al. |
| 2005/0251335 A1 * | 11/2005 | Ibrahim ....................... 701/213 |
| 2006/0028832 A1 * | 2/2006 | Horii et al. .................. 362/514 |
| 2006/0212218 A1 * | 9/2006 | Smith .......................... 701/209 |

OTHER PUBLICATIONS

Makino, Y., A Study on Curve Overshooting Prevention Support System Using Navigation System, pp. 1-6, no date.

* cited by examiner

METHOD OF ASSISTING DRIVER TO NEGOTIATE A ROADWAY

TECHNICAL FIELD

The present invention relates to systems for and methods of assisting drivers of vehicles to negotiate roadways. More specifically, the present invention concerns a method of assisting a driver to negotiate a roadway, particularly a curve or other complex or changing geometry in the roadway, by substantially automatically identifying the curve from a map database; calculating an estimated negotiable speed for the curve; storing curve information in a map database for subsequent use; advising the driver of the upcoming curve; warning the driver if he or she attempts to negotiate the curve at a speed that is greater than the estimated negotiable speed; controlling the vehicle in order to safely negotiate the curve whether or not the vehicle is already in a control mode; varying advisory, warning, and control behaviors; and determining the actual vehicle state as it pertains to entering and exiting the curve.

BACKGROUND OF THE INVENTION

Curved roadways can be a significant source of roadway departures. Some possible causes for such mistakes include the driver being distracted and not identifying the upcoming curve in time to slow down with the result being that the vehicle enters the curve too fast; the driver being drowsy or intoxicated and not providing the correct steering action required to successfully negotiate the curve; the driver intentionally approaching the curve at a high speed while driving aggressively and overestimating his or her or the vehicle's capabilities in a curve; or the driver underestimating the weather conditions.

It is known in the prior art to use forward-looking sensors to attempt to identify upcoming curves in the roadway. But such sensors are limited in range and therefore cannot identify curves substantially in advance of encountering them and so may not identify or determine the existence of the curve, a dangerous characteristic of the curve, or other potentially dangerous situational factors (e.g., severity of the curve, adverse weather conditions, or adverse road conditions) in time to warn the driver and avoid an accident.

Thus, an improved method of assisting a driver to negotiate a roadway, particularly curves in the roadway, is needed.

SUMMARY OF THE INVENTION

The present invention provides a method of assisting a driver to negotiate a roadway, particularly a curve or other complex or changing geometry in the roadway, by substantially automatically identifying the curve from a map database; calculating an estimated negotiable speed for the curve; advising the driver of the upcoming curve; warning the driver if he or she attempts to negotiate the curve at a speed that is greater than the estimated negotiable speed; and attempting to control the vehicle in order to safely negotiate the curve whether or not the vehicle is already in a control mode. When the curve is identified in advance rather in real-time, identification of the curve, and possibly one or more characteristics of the curve as well as the estimated negotiable speed, may be stored in an in-vehicle or remote map database for subsequent access and use as needed. Furthermore, the advisory, warning, and control behaviors may be varied based on pre-established or determined conditions. Additionally, the actual vehicle state as it pertains to entering and exiting the curve may be determined to supplement or verify one or more calculated curve characteristics.

These and other features of the present invention are discussed in greater detail in the section below titled DESCRIPTION OF THE PREFERRED EMBODIMENT (S).

BRIEF DESCRIPTION OF THE DRAWINGS

A preferred embodiment of the present invention is described in detail below with reference to the attached drawing figures, wherein.

DESCRIPTION OF THE PREFERRED EMBODIMENT(S)

Figures 1, 1A:
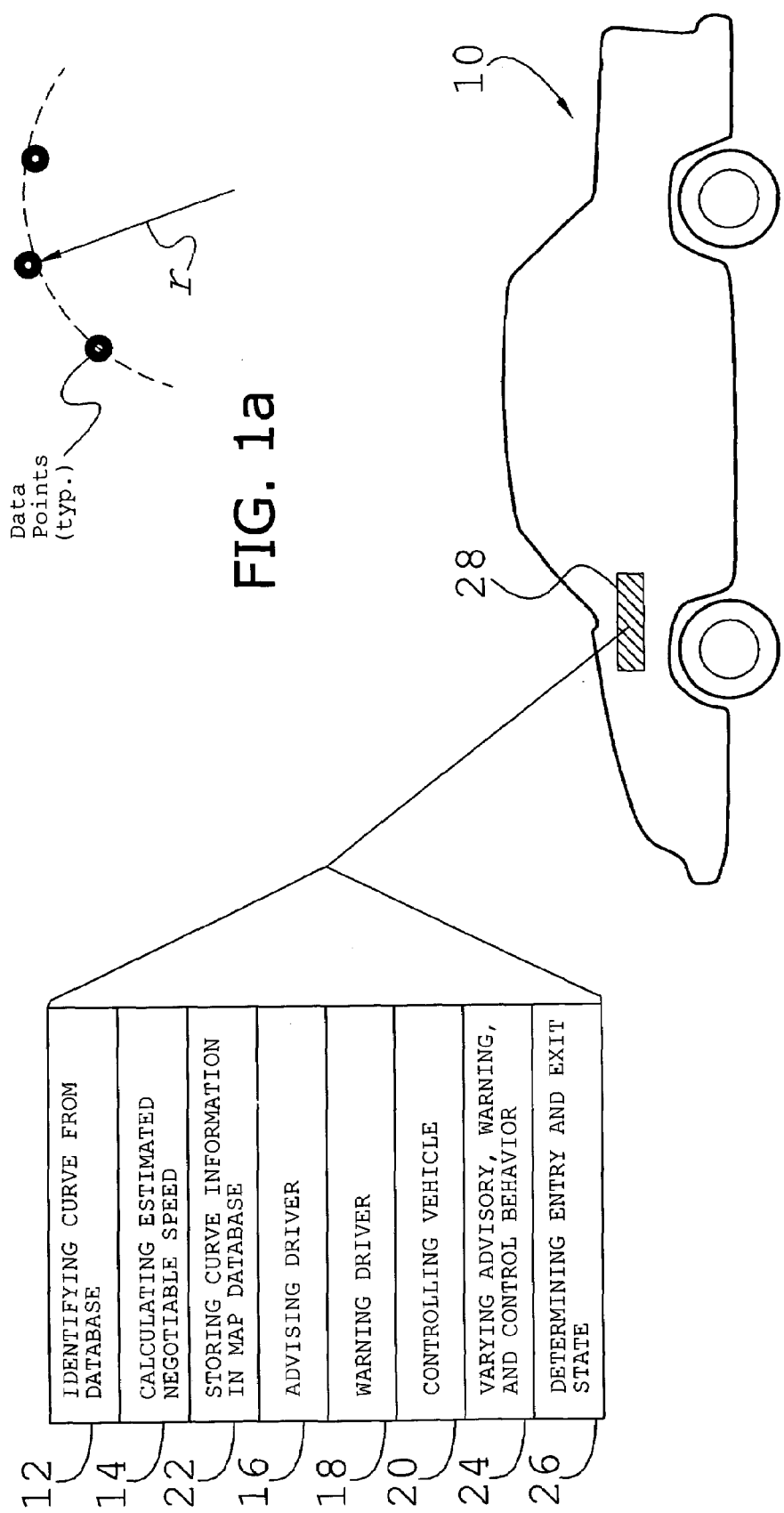
FIG. 1 is a depiction of a series of functions involved in practicing a preferred embodiment of the method of the present invention.
FIG. 1a is a diagram depicting a plurality of three data points being fitted by a circle of radius, r, during the curve identification step (12) shown in FIG. 1.

With reference to the figures, a method is herein described and otherwise disclosed in accordance with a preferred embodiment of the present invention. Broadly, referring to FIG. 1, the present invention provides a method of assisting a driver of a vehicle 10 to negotiate a roadway, particularly a curve or other complex or changing geometry in the roadway, by substantially automatically identifying the curve from a map database, as depicted in box 12; calculating an estimated negotiable speed for the curve, as depicted in box 14; advising the driver of the upcoming curve, as depicted in box 16; warning the driver if he or she attempts to negotiate the curve at a speed that is greater than the estimated negotiable speed as depicted in box 18; and attempting to control the vehicle 10 in order to safely negotiate the curve whether or not the vehicle 10 is already in a control mode, as depicted in box 20. When the curve is identified in advance rather in real-time, identification of the curve, and possibly one or more characteristics of the curve as well as the estimated negotiable speed, may be stored in an in-vehicle or remote map database for subsequent access and use, as depicted in box 22. Furthermore, the advisory, warning, and control behaviors may be varied based on pre-established or determined conditions, as depicted in box 24. Additionally, the actual vehicle state as it pertains to entering and exiting the curve may be determined to supplement or verify one or more calculated curve characteristics, as depicted in box 26. It will be appreciated that each of the aforementioned functions, or steps, which are described below in greater detail, may be implemented independently or in any combination, including all together, to accomplish the goal of assisting the driver to negotiate the roadway. It will also be appreciated that the method may be implemented in hardware, software, firmware, or any combination thereof as a system 28 that is located entirely on the vehicle 10 or partly on the vehicle 10 and partly remotely. It will also be appreciated that a variety of information or data may be received by the system 28 from remote sources for use by the method, and that such information or data may include, for example, GPS signals from orbiting satellites; weather information from a public or private weather service; and road information from a public or private road monitoring service.

Identifying Curve from Map Database

Production map databases generally use a series of points to represent a roadway. Straight roadways can be represented by as few as two points: one point at each end of the straight segment. Curved roadways may be represented by a plurality of closely spaced points in order to accurately represent the roadway's geometry. From these points, curve or simple straight-line fitting techniques can be used to estimate the heading and curvature of the roadway. In addition to spatial information, the data points may also contain information regarding change in heading, or yaw-rate, as measured by a collection vehicle or device. The yaw-rate information can be used to directly represent the roadway's curvature after compensating for the collection vehicle's or device's speed or by indirectly improving the curvature estimate when used as a curve-fitting parameter or performance measure.

One curve-fitting technique for estimating roadway curvature is to fit a circle onto three consecutive points as shown in FIG. 1a, wherein the inverse of the radius of the circle can represent the average curvature among those three points or the curvature at any one of the three points. Similarly, roadway heading at each point can be calculated using the same circle or by simply connecting straight-line segments between the points and averaging the heading into and heading out of a point to represent the heading at that point. Also, any averaging or calculations may take into account the spacing between the points.

Figure 2:
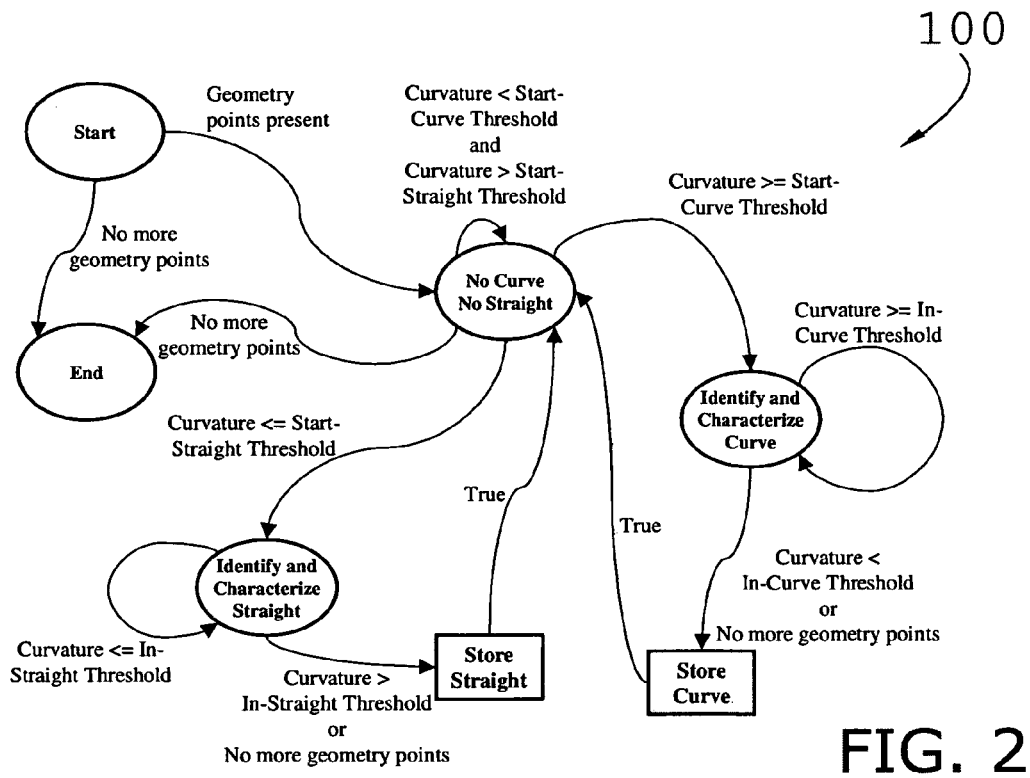
FIG. 2 is a state diagram depicting a process of identifying curves from a map database.

From the roadway heading and curvature, a curve can be identified by the following method which, augmented with the ability to identify straight segments, is described by the state machine 100 shown in FIG. 2 for sequentially analyzing each point or interpolated point along the map-represented roadway. Each such analysis preferably includes a comparison of the curvature magnitude against a "Curve Start Threshold". When a point has a curvature greater than the Curve Start Threshold, a "Curve Start" is declared and subsequent points are compared against an "In-Curve Threshold". When the magnitude of curvature is less than the In-Curve Threshold, a "Curve End" is declared. The points examined at the Curve Start, Curve End, and therebetween define a "Candidate Curve".

Once a Candidate Curve has been defined, information on any one or more of the following characteristics can be collected for the Candidate Curve. This information can be parsed and compared against thresholds and weights to identify "True Curves" and thereby eliminate some Candidate Curves from further consideration. The information collected for Candidate Curves and subsequently inherited by True Curves may include: Curve Start location; curve length; heading at Curve Start; heading at Curve End; heading change; direction (e.g., left, right, s-curve); average curvature; peak curvature; minimum curvature; road classification (e.g., interstate, arterial, connector, local, urban, suburban, rural, paved/unpaved, part of an overpass/underpass, ramp); accident statistics associated with the roadway near the curve; and posted speed limit and advisory speed limit information for the curve.

One example of how this information can be used to discard a Candidate Curve involves applying a threshold on curve length. For example, any Candidate Curve with a curve length of less than 20 meters could be discarded as being inconsequential.

Calculating Estimated Negotiable Speed

Once a True Curve has been identified, an estimated negotiable speed can be assigned according to the curve's characteristics (such as those listed above) as well as such other factors as driver preference, driver capability, vehicle capability, and estimated error in the curvature and heading change information.

One approach for assigning an estimated negotiable speed is to assume an acceptable lateral acceleration for the vehicle 10. Given the average roadway curvature, the estimated negotiable speed could be based on the equation:

$$V_{EstimatedNegotiable} = \sqrt{a_{AcceptableLateral} R_{CurveRadius}}$$

Similarly, the acceptable lateral acceleration measure could be modified by other curve characteristics. For example, if a large number of crashes occur at the location, the magnitude of the acceptable lateral acceleration could be reduced by an appropriate amount, such as 0.1 g. Similarly, if the curve is long, the acceptable lateral acceleration could be appropriately reduced. Also, superelevation of the roadway can be used to determine or modify the estimated negotiable speed.

During real-time operation of any advisory, warning, or control function, the estimated negotiable speed or the acceptable lateral acceleration, or some derivative thereof, could be modified based on some driver input (sensitivity), driver skill estimate, and/or available actual or estimated weather or road condition information.

Storing Curve Information in Map Database

The calculation required for identifying a True Curve can occur in real-time as the vehicle 10 is moving along the roadway. Alternatively or additionally, the True Curve identification could be performed in advance by a map-maker or navigation unit supplier or even by the vehicle 10 when more processing time is available and then placed into a database for subsequent access and use as needed during real-time operation. As a result, the identification of the True Curve, and possibly one or more of its associated characteristics as well as the estimated negotiable speed, can be stored in any combination of the following example locations: a map database maintained by a map-maker; a map database supplied to a vehicle manufacturer and used during real-time operation; a map database generated and maintained locally on the vehicle 10 in non-volatile memory; or a map database generated and maintained locally on the vehicle 10 in volatile memory.

Advising Driver

Figure 3:
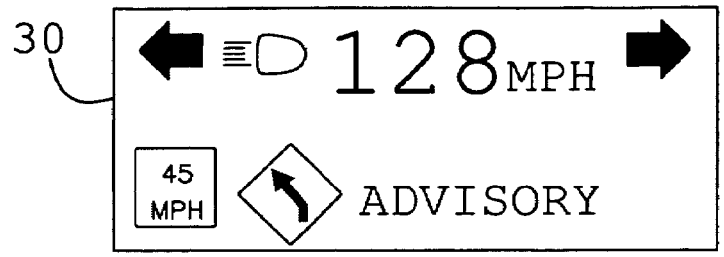
FIG. 3 is a depiction of a first head-up display ("HUD"), or in-vehicle display, for advising a driver of an upcoming curve.
Figure 6:
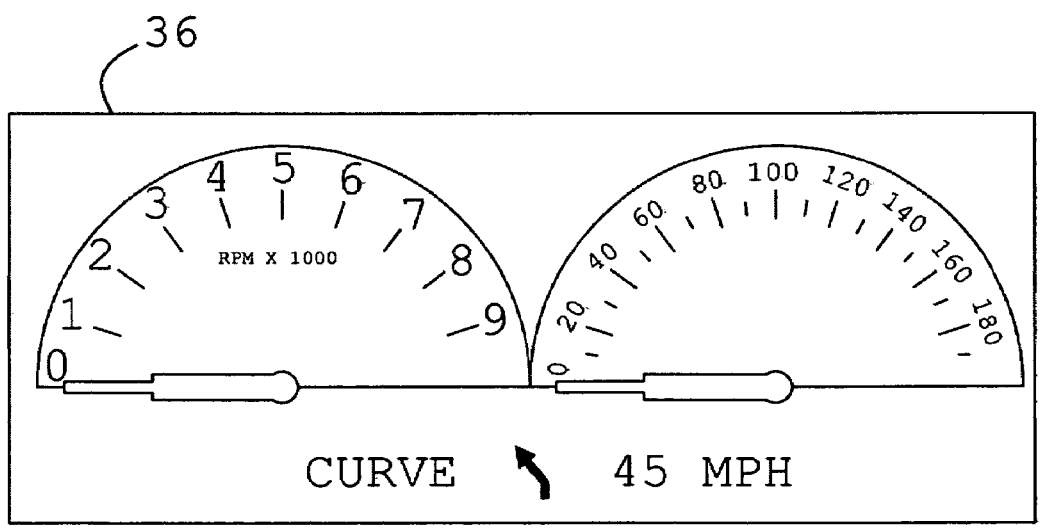
FIG. 6 is a depiction of a text display for advising a driver of the upcoming curve.

Once a True Curve has been identified ahead of the vehicle 10, advisory information can be delivered to the driver to assist him or her to negotiate the curve. Possible delivery mechanisms for such advisories include: audible communication indicating the upcoming curve; curve ahead and/or direction indication on a display in the vehicle 10 (e.g., a head-up display 30 as shown in FIG. 3, a telltale, navigation unit, a haptic actuator/display, or a text display 36 as shown in FIG. 6); or posted speed limit information for the curve on a display.

The timing for delivery of the advisory information should depend on the relative location of the vehicle 10 with respect to the start and end of the curve. The advisory information may, for example, be delivered to the driver when the vehicle 10 is within some distance of or some time before the Curve Start. Likewise, the information may continue to be delivered for a minimum time, minimum distance, or until some distance or time from the Curve End. Speed thresholds could be used requiring that the vehicle 10 be above a certain speed before warnings are issued in order to reduce false alarms or other nuisance to the driver.

Warning Driver

Figure 4:
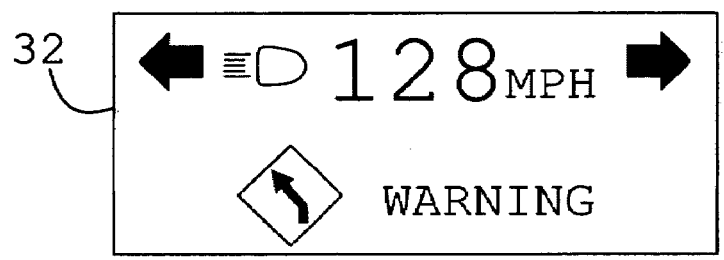
FIG. 4 is a depiction of a second HUD for warning the driver of the upcoming curve.

If it is determined that the vehicle 10 may enter a curve at a speed that exceeds the estimated negotiable speed, warning information can be delivered to the driver to warn him or her to slow down before entering the curve or while in a curve with varying curvature. Possible delivery mechanisms for such warnings include: audible communication warning the driver to slow the vehicle 10; curve warning indication on a display in the vehicle 10 which uses one or more colors or other indicators to indicate one or more warning levels (e.g., a head-up display 32 as shown in FIG. 4, a telltale, a navigation unit, a haptic actuator/display, a text display), curve direction indication on a display in the vehicle 10; or posted speed limit information for the curve on a display The criteria for making the decision that the vehicle 10 may enter the curve at an unsafe speed can be based on any combination of the following: vehicle speed; estimated negotiable speed; vehicle acceleration; brake status; brake pressure; road grade (either estimated on the vehicle 10 or referenced from a database); distance to Curve Start; distance to a location relative to the start of the curve where there is an expectation that the vehicle 10 will be at the speed used to negotiate the curve; time of day; weather conditions; driver skill; driver preference, or number of annual crashes at the location.

Controlling Vehicle

In a situation in which the vehicle 10 is operating under automated control (such as cruise control) and it is determined that the vehicle 10 is approaching a curve possibly at an unsafe speed, the vehicle 10 can be slowed as much as possible automatically before entering the curve or white in a curve with varying curvature.

Similarly, in a situation in which the vehicle 10 is operating under driver control and it is determined that the vehicle 10 may enter a curve faster than the estimated negotiable speed, an attempt can be made to slow the vehicle 10 by any one or more following actions: automatic actuation of the brakes; partial or whole disregard for driver input through an accelerator pedal not mechanically linked to the engine throttle resulting in engine and wind drag slowing the vehicle 10; or reduction in fuel (or other ingredient) to the engine required to maintain the speed of the vehicle 10.

Figure 5:
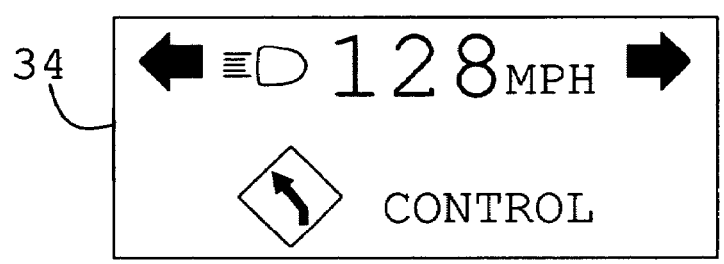
FIG. 5 is a depiction of a third HUD for communicating to the driver that control measures for negotiating the curve are in progress.

The criteria for making the decision that the vehicle 10 may enter the curve faster than the estimated negotiable speed can be based on any of the criteria listed above with respect to warning the driver. An exemplary head-up display 34 indicating control is shown in FIG. 5.

Varying Advisory, Warning, and Control Behavior

Because driver preference, driver skill, and environmental conditions vary greatly, the following techniques may be used to measure these and responsively modify the behavior of the advisory, warning, or control functions. In one contemplated implementation, preferences may be gathered from the driver in terms of the severity of curves for which he or she would like to receive advisories, warnings, or control. For example, a particular driver may indicate that he or she only desires information about curves with a curvature higher than an indicated amount or curves that traverse a specified angle. Likewise, the preference could be adjustable for various road types. Alternatively or additionally, preferences may be gathered from the driver in terms of how soon he or she would like to be advised. The indication could be time-based, distance-based, or based on other criteria. Alternatively or additionally, advising, warning, or controlling may occur differently depending on the time of day or day of the week as indicated by a time source (such as GPS) or by a sensor in the vehicle 10. Alternatively or additionally, advising, warning, or controlling may occur differently depending on whether the driver is driving in an area familiar to him or her. Alternatively or additionally, advising, warning, or controlling may occur differently depending on the presence and intensity of weather conditions and/or adverse road conditions.

Determining Entry and Exit State

Because the map database may contain errors with respect to the actual roadway geometry, it is possible that the curve identification methods described above may incorrectly classify the start and end locations of curves. In the case in which the end of the curve is used to trigger the end of the delivery of advisory or warning information to the driver, an incorrect Curve End location could result in continued display of information after the vehicle 10 has already exited the curve. To prevent this from taking place, the present invention may employ techniques for identifying the actual exit of a curve.

Figure 7:
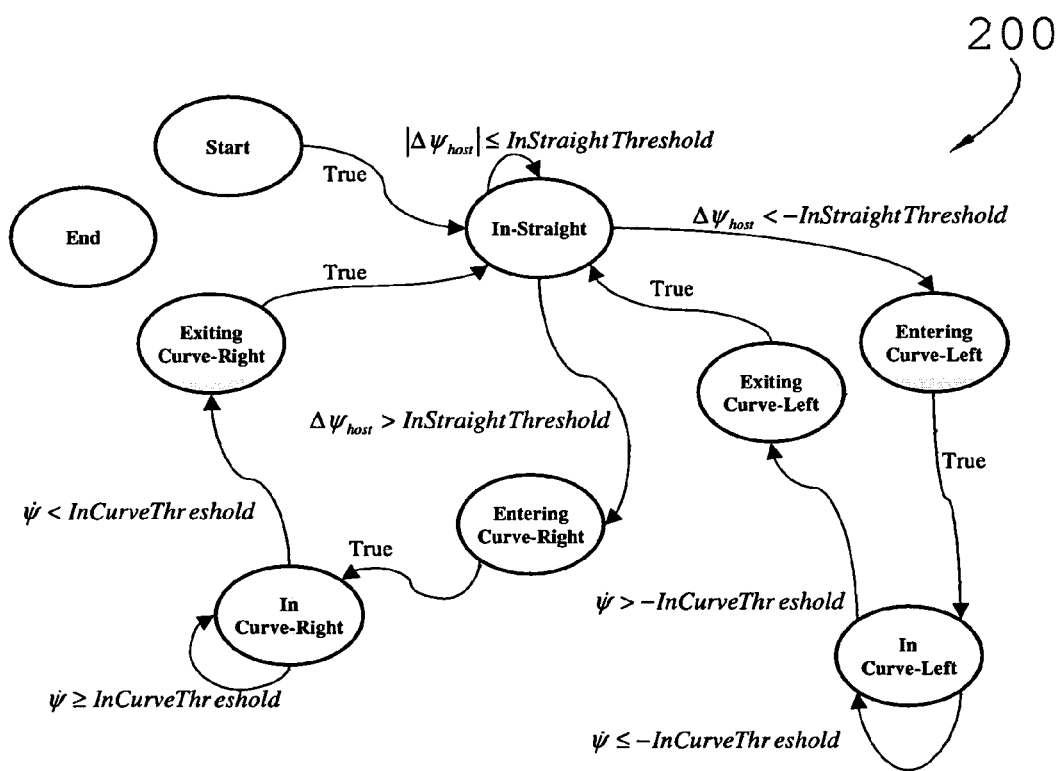
FIG. 7 is a state diagram depicting a process of determining a vehicle state as it pertains to entering and exiting the curve.

One such technique utilizes a yaw-rate estimate (either from a yaw-rate sensor, lateral accelerometer sensor, or from differential wheel speed) to estimate curve-related states for the vehicle 10. A state machine 200 for estimating host state is shown in FIG. 7. In the diagram, $\dot{\psi}$ is an estimate of yaw-rate and $$\Delta \psi_{host} = \int_{t-T_{CurveYawRateHistory}}^{t} \dot{\psi}\, dt$$

over a time period defined by $T_{CurveYawRateHistory}$. Entry into either "Exiting" state can be used to detect a real-time end of curve. If the real-time end of curve is detected within some distance or time to a Curve End of a True Curve, the information being delivered to the driver regarding the curve can be removed.

Another method for detecting the actual curve end could use the absolute heading at the curve end compared to the True Curve heading at the calculated Curve End. As the two values become close to one another at some distance or time from the Curve End of the True Curve, the information being delivered to the driver regarding the curve can be removed.

Exemplary Use and Operation

In non-limiting simplified and exemplary use and operation, the method of the present invention of assisting the driver of the vehicle 10 to negotiate the roadway may proceed as follows.

The method begins by substantially automatically identifying a curve from an electronic map database. This is accomplished by substantially automatically accessing the electronic map database, wherein the electronic map database represents the geometry of the roadway using a plurality of data points containing at least spatial information and possibly other information as well, and then estimating a heading and a curvature of a particular portion of the roadway on which the vehicle 10 is traveling using the plurality of data points. This initial step may occur in real-time, i.e., as the vehicle 10 is traveling and heading toward the curve, or may occur significantly in advance in which case the identification and any additional information may be stored in a database for subsequent use, as discussed below.

Next, an estimated negotiable speed is calculated for the identified curve based at least on one or more characteristics of the curve and possibly on one or more characteristics of the vehicle 10 and/or of the driver as well. The resulting estimated negotiable speed can be adjusted downward based on any relevant information or data, such as, for example, a number of vehicular accidents associated with the curve and/or current adverse weather or road conditions.

As mentioned, identification of the curve, and, as desired, even estimation of the appropriate speed for navigating the curve, may occur in real-time or in advance. When occurring in advance, the resulting data may be stored in a database for subsequent access and use. This database may be located on the vehicle 10 or may be located remotely from the vehicle 10 and the data stored therein accessed as needed.

When the driver is about to encounter an identified curve, the driver may be actively advised of the curve's existence and, as desired, one or more relevant characteristics of the curve, such as, for example, its heading, curvature, and the estimated negotiable speed for negotiating it. The advisory is preferably provided a pre-established distance from or time before encountering the curve. This lead distance or time may be adjusted as appropriate for given circumstances. For example, the lead distance or time may be extended when adverse driving, road, or weather conditions exist in order to give the driver more time to prepare for the encounter with the curve. If the driver attempts to negotiate the curve at a speed that is greater than the estimated negotiable speed, the driver may be appropriately warned of the danger of doing so. If the driver attempts to negotiate the curve at a speed that is greater than the estimated negotiable speed, the vehicle 10 may come under substantially automatic control as necessary to attempt to safely negotiate the curve. Any one or more of the aforementioned advisory, warning, and control behaviors may be varied in response to one or more pre-established or determined conditions Lastly, an actual state of the vehicle 10 may be determined as the vehicle 10 negotiates the curve. This may include, for example, identifying in real-time a vehicle state (e.g., yaw) that signifies the actual end of the curve so that advisory, warning, and control behaviors can be discontinued in a timely manner.

Although the present invention has been described with reference to the preferred embodiments illustrated in the drawings, it is noted that equivalents may be employed and substitutions made herein without departing from the scope of the invention as recited in the claims.

The invention claimed is:

1. A method of assisting a driver of a vehicle to negotiate a curved roadway, by identifying a true curve, determining an estimated negotiable speed for the true curve, and assisting the driver when an actual speed of the vehicle exceeds the estimated negotiable speed, the method comprising the steps of:
    (a) substantially automatically accessing an electronic map database, wherein the electronic map database represents a geometry of the roadway using a plurality of data points containing spatial information;
    (b) estimating a heading and a curvature magnitude of a particular portion of the roadway on which the vehicle is traveling using the spatial information of the plurality of data points, and identifying the true curve based on the heading or curvature and by comparing the curvature magnitude against a curve start threshold;
    (c) calculating the estimated negotiable speed for the identified true curve based at least on one or more characteristics of the curve;
    (d) determining the actual speed of the vehicle, comparing the actual speed and estimated negotiable speed, and autonomously generating a response when the actual speed of the vehicle exceeds the estimated negotiable speed.

2. The method as set forth in claim 1, wherein in step (b) the heading is estimated by connecting straight line segments between at least three consecutive data points of the plurality of data points and averaging a heading into and out of a data point to represent the heading at that point.

3. The method as set forth in claim 1, wherein in step (b) the curvature magnitude is estimated by fitting a circle onto at least three consecutive data points of the plurality of data points, wherein the inverse of the radius of the circle represents an average curvature along the three consecutive data points.

4. The method as set forth in claim 1, wherein in step (b) the plurality of data points further contain information regarding a rate of directional change associated with the particular portion of the roadway, and wherein the curvature magnitude is estimated using the rate of directional change.

5. The method as set forth in claim 1, wherein step (b) further includes
    sequentially analyzing each point along the roadway, including comparing a curvature magnitude for each point with a curve start threshold value;
    identifying a curve start when a point has a curvature magnitude that is greater than the curve start threshold;
    comparing curvature magnitudes for subsequent points with an in-curve threshold value, after a curve start has been determined;
    identifying a curve end when the curvature magnitude is less than the in-curve threshold;
    identifying the curve start, curve end, and points therebetween as a candidate curve; and
    determining the true curve by collecting and processing information regarding the candidate curve and comparing the information to at least one threshold.

6. The method as set forth in claim 1, wherein in step (c) the estimated negotiable speed is calculated as the square root of a radius of the curve multiplied by an acceptable lateral acceleration for the vehicle.

7. The method as set forth in claim 1, wherein in step (c) the estimated negotiable speed is adjusted based on a number of vehicular accidents associated with the curve.

8. The method as set forth in claim 1, wherein in step (c) the estimated negotiable speed is adjusted based on a current weather condition.

9. The method as set forth in claim 1, wherein step (d) further includes the step of advising the driver of the identified curve.

10. The method as set forth in claim 9, wherein the advisory is communicated to the driver a pre-established time before the vehicle reaches the curve.

11. The method as set forth in claim 1, step (d) further including the step of warning the driver if the driver attempts to negotiate the curve at a speed that is greater than the estimated negotiable speed.

12. The method as set forth in claim 1, step (d) further including the step of controlling the vehicle as necessary to attempt to safely negotiate the curve, wherein controlling the vehicle includes substantially automatically at least partially disregarding an accelerator input by the driver in order to slow the vehicle to the estimated negotiable speed.

13. The method as set forth in claim 1, further including the step of storing information concerning the curve in the database for subsequent access and use.

14. The method as set forth in claim 1, step (d) further including the step of varying an automatic response to the identified curve based on a condition.

15. The method as set forth in claim 14, wherein the condition is a pre-established driver preference.

16. The method as set forth in claim 14, wherein the condition is a time of day when the curve is encountered.

17. The method as set forth in claim 14, wherein the condition is whether the driver is familiar with the curve.

18. The method as set forth in claim 1, further including the step of determining the yaw rate of the vehicle when entering and exiting the curve.

19. The method as set forth in claim 18, further including identifying in real-time an actual end of the curve.

20. The method as set forth in claim 19, wherein the actual end of the curve is identified based on a yaw rate of the vehicle.

21. The method as set forth in claim 19, wherein the actual end of the curve is identified based on a comparison between an absolute vehicle heading at the end of the curve and a curve heading at the end of the curve, wherein a convergence of the absolute vehicle heading and the curve heading indicates the actual end of the curve.

22. A method of assisting a driver of a vehicle to negotiate a curved roadway, by identifying candidate curves, calculating a true curve among the candidate curves, determining an estimated negotiable speed for the true curve, and warning the driver when the speed of the vehicle exceeds the estimated negotiable speed, the method comprising the steps of:
  (a) substantially automatically accessing an electronic map database, wherein the electronic map database represents a geometry of the roadway using a plurality of data points containing spatial information;
  (b) estimating a heading and a curvature of a particular portion of the roadway on which the vehicle is traveling using the spatial information of the plurality of data points, and identifying a candidate curve based on the heading or curvature and based on a first threshold;
  (c) calculating a true curve based on the candidate curve and a second threshold, and calculating an estimated negotiable speed for the identified true curve based at least on one or more characteristics of the curve;
  (d) advising the driver with respect to the upcoming true curve;
  (e) warning the driver if the driver attempts to negotiate the true curve at a speed that is greater than the estimated negotiable speed; and
  (f) controlling the vehicle as necessary to attempt to safely negotiate the true curve.

23. A method of assisting a driver of a vehicle to negotiate a curved roadway, by determining an estimated negotiable speed, and warning the driver when the speed of the vehicle exceeds the estimated negotiable speed, the method comprising the steps of:
  (a) identifying a curve from an electronic map database including a plurality of data points containing spatial information, by estimating a heading and a curvature magnitude for each of the data points and comparing the curvature magnitudes to curve start and in-curve thresholds;
  (b) calculating the estimated negotiable speed for the identified curve based at least on one or more characteristics of the curve;
  (c) advising the driver with respect to the upcoming curve;
  (d) warning the driver if the driver attempts to negotiate the curve at a speed that is greater than the estimated negotiable speed;
  (e) controlling the vehicle as necessary to attempt to safely negotiate the curve; and
  (f) varying the advisory behavior of step (c), the warning behavior of step (d), and the control behavior of step (e) in response to one or more conditions.

* * * * *